US011525532B2

(12) United States Patent
McAlpine et al.

(10) Patent No.: US 11,525,532 B2
(45) Date of Patent: Dec. 13, 2022

(54) PLUMBING CONNECTOR, ASSEMBLY AND ASSOCIATED METHODS

(71) Applicant: McAlpine & Co Limited, Glasgow (GB)

(72) Inventors: James Edward McAlpine, Glasgow (GB); Robert G. McAlpine, Glasgow (GB)

(73) Assignee: McAlpine & Co., Limited, Glasgow (GB)

( * ) Notice: Subject to any disclaimer, the term of this patent is extended or adjusted under 35 U.S.C. 154(b) by 149 days.

(21) Appl. No.: 16/639,721

(22) PCT Filed: Aug. 17, 2018

(86) PCT No.: PCT/GB2018/052342
§ 371 (c)(1),
(2) Date: Feb. 17, 2020

(87) PCT Pub. No.: WO2019/034893
PCT Pub. Date: Feb. 21, 2019

(65) Prior Publication Data
US 2020/0370690 A1 Nov. 26, 2020

(30) Foreign Application Priority Data

Aug. 17, 2017 (GB) ..................................... 1713232

(51) Int. Cl.
*F16L 27/047* (2006.01)
*E03C 1/122* (2006.01)
*E03C 1/24* (2006.01)
(52) U.S. Cl.
CPC ............ *F16L 27/047* (2013.01); *E03C 1/122* (2013.01); *E03C 1/24* (2013.01)
(58) Field of Classification Search
CPC ........................... E03C 1/24; F16L 27/04–047
See application file for complete search history.

(56) References Cited

U.S. PATENT DOCUMENTS 1,347,470 A    7/1920  Bard
2,165,052 A *  7/1939  Hering .................. F16L 27/067
                                                285/271
(Continued)

FOREIGN PATENT DOCUMENTS

WO         2011/187441 A1    12/2011

OTHER PUBLICATIONS

United Kingdom Search Report issued by the United Kingdom Intellectual Property Office for application GB1713232.5 dated Sep. 1, 2017 (5 pages).

(Continued)

*Primary Examiner* — David P Angwin
*Assistant Examiner* — Nicholas A Ros
(74) *Attorney, Agent, or Firm* — Dinsmore & Shohl LLP

(57) ABSTRACT

A connector includes a seat portion and a body portion. The seat portion includes a seat having a first curved surface. The body portion includes a curved body having a second curved surface. A nut portion is screwed to the seat portion, with a flexible portion and washer disposed therebetween. To connect the seat portion and the body portion, the curved body can be inserted through an opening of the nut portion, and the flexible portion and washer. The flexible portion may resist, but not stop, the curved body from being moved therethrough. The curved body may be seated within the seat and configured such that angular and/or rotational adaptation of the seat portion relative to the body portion is permitted. The nut portion can be adjusted to compress the flexible portion such that the curved body is retained in the vicinity of the seat, while still permitting angular and/or rotational adaptation of the seat portion relative to the body portion.

17 Claims, 5 Drawing Sheets

(56) References Cited

U.S. PATENT DOCUMENTS

| | | | | |
|---|---|---|---|---|
| 2,477,478 | A * | 7/1949 | Donahue | E03C 1/22 285/191 |
| 2,564,938 | A * | 8/1951 | Warren | F16L 27/047 285/918 |
| 3,663,043 | A * | 5/1972 | Walton | F16L 27/067 285/113 |
| 4,427,217 | A | 1/1984 | Duvet et al. | |
| 4,427,218 | A * | 1/1984 | Duvet | F16L 37/002 285/184 |
| 5,127,681 | A * | 7/1992 | Thelen | F16L 27/073 285/121.7 |
| 5,368,342 | A * | 11/1994 | Latham | F16L 27/053 285/261 |
| 6,460,898 | B1 * | 10/2002 | Chieh | F16L 27/023 285/146.1 |
| 6,859,956 | B2 * | 3/2005 | Mantyla | E03C 1/284 285/271 |
| 9,714,504 | B2 * | 7/2017 | Bird | E03C 1/24 |
| 9,896,827 | B1 * | 2/2018 | Hsieh | E03C 1/232 |
| 2002/0116759 | A1 | 8/2002 | Mantyla et al. | |
| 2003/0184086 | A1 | 10/2003 | Christianson | |
| 2009/0267344 | A1 | 10/2009 | Andrei | |
| 2013/0076027 | A1 * | 3/2013 | Maenishi | F16L 21/04 285/338 |
| 2015/0089736 | A1 | 4/2015 | Bird et al. | |
| 2016/0186418 | A1 * | 6/2016 | Yu | F16K 31/465 4/682 |

OTHER PUBLICATIONS

Chinese Search Report issued by the Chinese Patent Office for application 201880067297.X dated Nov. 30, 2020 (13 pages with English translation).

International Search Report and Written Opinion for International Application No. PCT/GB2018/052342 filed Aug. 17, 2018.

* cited by examiner

PLUMBING CONNECTOR, ASSEMBLY AND ASSOCIATED METHODS

CROSS REFERENCE TO RELATED APPLICATIONS

This application is the U.S. national stage of PCT/GB2018/052342 filed Aug. 17, 2018, which claims priority of Great Britain Patent Application 1713232.5 filed Aug. 17, 2017 both of which are hereby incorporated by reference in their entirety.

FIELD OF THE INVENTION

The present disclosure relates to a plumbing connector, such as particularly, but not exclusively, for use in bath waste plumbing and/or in ventilation systems.

BACKGROUND OF THE INVENTION

In plumbing systems, such as domestic, commercial or industrial plumbing in buildings there are provided plumbing connections for connecting the waste outlets of waste or grey water disposal appliances such as toilets, bidets, baths, showers, sinks or the like to drainage systems.

Waste and overflow assemblies may be used to connect a grey or waste water overflow outlet of a vessel such as a bathtub, sink or the like to a drainage system such as a sewer or soil stack. A bath or sink waste assembly may include an overflow assembly which is mounted to the water overflow outlet, and which is in turn connected to a down pipe connected by a T-piece or similar arrangement to a pipe section leading from the plug waste water outlet. The overflow outlet may be covered with a decorative overflow cover.

As the walls of a bathtub or sink may be angled away from the vertical, the down pipe of the bath or sink waste may need to be able to conform to this angle to reduce the volume of space occupied by the waste assembly, while the overflow assembly may need to be suitably oriented to be mountable to the overflow outlet.

An example of adjustable bath waste includes a section of down pipe formed from corrugated plastic tubing; such tubing may be deformed by the installer to provide a desired angle, and may retain that angle. However, installation and use of this corrugated plastic tubing may encounter several perceived difficulties. For example, the interior surface of the down pipe may necessarily also be corrugated, whereas smooth interior surfaces may be less likely to trap particles and objects. Further, installers may wish to avoid the use of plastic components in certain situations, given the perception that plastic components provide a greater hazard during fires than metal components. Indeed, some of these perceived difficulties may be reinforced by legislative standards set for plumbing installations in certain jurisdictions, such that in order to comply with plumbing codes only rigid pipe work assemblies, in solid metal with no or limited flexibility, are permissible. Further, an installer may use a gas blow torch or the like to heat up any of the plumbing components (e.g. whether plastic or metal) of a waste and/or overflow assembly so that the heated components may become pliable (e.g. or less rigid). In this case, it may be easier for an installer to connect a water outlet to a plumbing drainage system, or the like. For example, if the relative positioning of the water outlet and the plumbing drainage system is awkward, the installer may heat up at least one of the plumbing components to allow the waste and/or overflow assembly to be more easily installed. There may be an environmental cost associated with the use of gas blow torches and/or excess numbers of plumbing components.

With ventilation and other plumbing systems, similar constraints and issues may arise.

SUMMARY OF THE PRESENT INVENTION

According to an example of the present disclosure there is provided a connector for a plumbing system. The connector may comprise a seat. The seat may comprise a first curved surface. The seat may connectable to a first fitting. The connector may comprise a body. The body may comprise a second curved surface for corresponding with the first curved surface of the seat. The body may be connectable to a second fitting. The body may be moveable relative to the seat so as to adapt to the relative angular orientation of the first and second fittings. The seat and the body may be configured to provide fluid communication between the first fitting and the second fitting. The connector may comprise a retaining element for releasably retaining the body in the seat.

In use, the connector may couple the first fitting to the second fitting so as to permit fluid communication therebetween. Where the first fitting and second fitting are angularly misaligned relative to each other, the connector may compensate for the angular misalignment by virtue of being adaptable according to the angular orientation of the first and second fittings. The connector may be configured to permit relative rotation of the body and the seat about an axis of the body and/or seat.

Where there is difficult-to-access space or angular or rotational misalignment between the first and second fittings, the connector may be easier to install between the first and second fittings because an installer may be able to angularly manipulate the connector, and/or the first and second fittings. By providing an ability to angularly manipulate the connector and/or the first and second fittings, an installer such as a plumber may not need to use excessive force or heat (e.g. from a blow torch) to install the connector, for example, within an awkward space or between misaligned first and second fittings.

The seat may be or comprise a seat portion. The body may be or comprise a body portion.

The seat and the body may be contactable to form a contacting area therebetween to prevent fluid from flowing via the contacting area. For example, application of pressure between the seat and body may prevent fluid flowing between the first and second fittings from leaking across the contacting area.

The retaining element may be configured to be adjustable relative to the seat such that the mechanical strength of the connection between the body and the seat is adjustable.

The retaining element may be configurable to clamp the connection to immobilise the body relative to the seat. The first fitting may be immobilised relative to the second fitting upon the connection being clamped.

The connector may comprise a flexible portion disposed or disposable between the body and the retaining element. The flexible portion may be configured for releasably retaining the body in the vicinity of the seat.

The flexible portion may assist in retaining the body in the connector. The flexible portion may flex to either allow the body to be inserted into or released from the connector. The flexible portion may be deformable. The flexible portion may be elastically deformable. The flexible portion may be plastically deformable. The flexible portion may be configured for sealing between at least a portion of the body and at least a portion of the seat. The flexible portion may flex so as to close or seal any gap or space between the body and the seat. The retaining element may be moveable relative to the body and/or the seat so as to cause the flexible portion to be deformed, compressed, or the like between seat and the body. The flexible portion may create a fluid-tight seal between the seat and the body. The flexible portion may create a fluid-tight seal between at least two of: the seat, the body and the retaining element.

The retaining element may be configurable to adjust the mechanical strength of the connection between the body and the seat by controlling a force applied by the flexible portion on the body by adjusting the retaining element relative to the seat.

The flexible portion may be configurable to apply a force such as a compressive force on the body upon the flexible portion being flexed by adjustment of the retaining element relative to the seat.

The retaining element may be configurable to clamp the connection by adjusting the retaining element such that the force is sufficient to immobilise the body relative to the seat.

The retaining element may comprise an opening for allowing the body to be inserted or removed therethrough. The retaining element may comprise or be in the form of a nut portion.

The flexible portion may be compressible. Compressibility of the flexible portion may allow the components of the connector to be secured in position once the connector has been appropriately adjusted. Thus, the connector may be secured in position once the correct alignment between the first and second fittings has been found. The flexible portion may provide sealing, which may improve the water-tightness of the connector. The retaining element may be configured to compress the flexible portion between the components of the connector. The flexible portion may reduce the risk of damaging the components of the connector when the retaining element is tightened. Some movement of the body relative to the seat may be permitted when the body is retained. The flexible portion may be fitted or mounted within the connector during manufacture of the connector; that is, the connector may be a "factory-provided" or "factory-sealed" unit. Alternatively, the flexible portion may be fitted or mounted within the connector during installation between the fittings. The flexible portion may be fixable to the retaining element, seat or body by welding, gluing or using any other adhesives, tape, and the like.

The flexible portion may be moveable so as to permit the body to be push-fitted to move into the vicinity of the seat.

In use, the body may be inserted into or withdrawn from the connector, for example, by flexing or deforming the flexible portion. Inserting or withdrawing the body from the connector may cause the flexible portion to move, flex or deform to permit said insertion or withdrawal.

The retaining element may be operatively associated with the seat, for example, the retaining element may be connected or mounted on the seat, either permanently or temporarily. The retaining element may be adjustable so as to define whether the body can or cannot be inserted or removed through the opening. Thus, in use, an installer may provide the retaining element so as to allow the body to be inserted through the opening to locate the second curved surface of the body in correspondence with, or in the vicinity of, the first curved surface of the seat. The installer may subsequently adjust the retaining element so as to prevent the body from being removed, and thus may allow the installer to adapt the connector according to the angular and/or rotational requirements of the first and second fittings. The preceding procedure may be reversed to disconnect the first and second fittings.

The flexible portion may be configured to prevent leakage from the connector. The flexible portion may be disposed between the body and the seat. The retaining element may be adjustable so as to deform or flex the flexible portion to provide a seal. The flexible portion may be adapted so as to define a restriction to prevent the body from being removed from the seat.

The body may comprise or define an olive. The body may comprise a curved outer surface and an opening extending axially therethrough. A curved portion of the body may comprise an approximately or substantially frusto-ovoidal or frusto-spherical surface. A curved portion of the seat may comprise an approximately or substantially frusto-ovoidal or frusto-spherical surface. The curved portions of the seat and the body may correspond to the first and second curved surfaces, respectively.

The connector may comprise or define a swivel joint. The swivel joint may comprise a ball joint. The swivel joint may comprise the olive. The swivel joint may comprise a cup. The olive may be received within the cup.

The flexible portion may be moveable between a first position in which the body is moveable through the flexible portion for allowing the connector to be assembled or disassembled, and a second position in which the body is retained in the seat.

The flexible portion may be flexible or deformable so as to permit a dimension of the flexible portion may be varied. The dimension may be an inner diameter of the flexible portion. The inner diameter of the flexible portion may depend on the relative positioning of the retaining element and the seat. Adjusting the retaining element may move the flexible portion so as to either allow or prevent the body from being inserted or removed from the seat.

The retaining element may be moveable relative to the seat so as to define a space between the body and the retaining element for housing the flexible portion. The amount of space between the body and the retaining element may vary according to movement of the flexible portion within the space. Compression of the flexible element in one direction may cause the flexible element to expand in another direction. In use, moving the retaining element relative to the seat moves the flexible portion relative to the body. Thus, the retaining element may be adjusted to move or provide the flexible portion with the first or second inner diameter.

The flexible portion may be substantially annular. The flexible portion may be ring-like. The flexible portion may comprise a circumferential cross-section adapted to fit within the variable space between the body and the retaining element.

The flexible portion may comprise an axially varying radial thickness. The flexible portion may comprise an axially varying radial thickness that decreases from an axial end of the flexible portion to the other axial end of the flexible portion.

An inner surface of the flexible portion may be shaped to substantially correspond to an outer surface of the body. The inner surface of the flexible portion may be curved or at least partially curved.

A portion of the radially inner surface of the flexible portion may be curved inwardly, for example concavely. A portion of the radially inner surface of the flexible portion may be curved outwardly, for example convexly. A portion of the radially inner surface of the flexible portion may be substantially planar. A portion of the radially outer surface of the flexible portion may be at least one of: curved inwardly, planar and curved outwardly. The degree of curvature of surfaces of the flexible portion may vary when, in use, the retaining element is moved relative to the seat. The flexible portion may comprise at least one substantially frusto-spherical or frusto-ovoidal surface.

The connector may comprise a spacer. The spacer may be disposed or disposable between the flexible portion and the retaining element.

The spacer may be configured to retain the flexible portion in the connector. The spacer may be shaped to prevent the flexible portion from moving, for example when in use, the retaining element is tightened relative to the seat. The spacer may comprise a washer, open washer, ring, open ring, or the like. The spacer may comprise or be formed of any appropriate material, for example, the flexible portion may comprise or be formed of a rubber material, a metal material, a plastics material such as HDPE, or the like.

The seat may comprise a first material and the body may comprise a second material.

A plumbing system may comprise various fittings that may need to be connected together so as to permit fluid and/or gas flow through the plumbing system. Different fittings may have different dimensions, may be made of different materials, and/or may be difficult to connect together using standard sized/shaped components. The connector may assist in connecting together different fittings which have different properties, which may or may not be difficult to join together depending on the particular properties of the respective materials.

The first material and the second material may be different. One of the first and second materials may comprise a metal. The other of the first and second materials may comprise a plastics material.

Both of the first and second materials may be the same.

One of the first and second materials may comprise a first plastics material, and the other of the first and second materials may comprise a second, different plastics material. One of the first and second materials may comprise a first metal, and the other of the first and second materials may comprise a second, different metal.

If the first and second materials are the same, the first and second materials may or may not be difficult to join and/or seal to form a fluid-tight joint. If the first material and the second material are different, there may or may not be difficulties or incompatibilities in terms of joining and/or sealing the first and second materials together, for example, using welding, gluing or other techniques.

The connector may permit fittings comprising the same or different materials to be connected together without needing to use a complicated joining method. In this manner, the connector may permit fittings of said same or different materials to be angularly and/or rotationally moveable relative to each other.

If the fittings to be connected are made of different materials, the connector may permit materials of different types to be joined together so as to permit fluid communication between the first and second fittings. Examples of typical materials used in plumbing systems may include metals such as steel, stainless steel, aluminum, brass, copper and the like, as well as plastics materials such as Polyvinyl Chloride (PVC), Acrylonitrile-Butadiene-Styrene (ABS), Polypropylene (PP) and the like, and as well as rubber materials and the like.

The connector may be used in various systems, for example, any kind of plumbing or drainage system, which may be concerned in the distribution or management of either of grey or waste water e.g. to a soil stack, sewer, or the like, via a liquid seal arrangement (e.g. in a waste trap, p-trap, or the like). Alternatively the connector may be used in a plumbing or drainage system concerned with the distribution or management of fresh water. The connector may be used in domestic, commercial, or industrial plumbing systems, and the like. The connector may be used to connect a waste assembly to another component of the plumbing system.

According to an example of the present disclosure, there is provided a connector for a plumbing system. The connector may comprise a throughbore. The connector may comprise at least one of: a seat and a body. The seat may comprise a first curved surface. The seat may be connectable to the throughbore. The body may comprise a second curved surface. The body may be connectable to the throughbore.

The second curved surface may be for correspondence with the first curved surface of the seat of another connector. The body may be moveable relative to the seat so as to adapt to the relative angular orientation of the throughbore and a further fitting. The seat and body may be configured to provide fluid communication between the throughbore and the further fitting. The throughbore may comprise a pipe.

The connector may comprise the seat disposed at an end of the throughbore. The connector may comprise the body disposed at an end of the throughbore. Both ends of the throughbore may comprise a seat as described herein. Both ends of the throughbore may comprise a body as described herein. One end of the throughbore may comprise a seat as described herein and the other end of the throughbore may comprise a body as described herein.

According to an example of the present disclosure, there is provided an assembly an assembly for a plumbing system. The assembly may comprise at least one connector according to any example of the present disclosure. The assembly may comprise a fitting for connecting to the at least one connector.

The fitting may be a conduit or pipe. The conduit may be a pipe, for example, a down pipe or other pipe for connecting a grey or waste water outlet to a drainage system.

The assembly may comprise a further connector. The further connector may be in accordance with any example of a connector according to the present disclosure. Both of the connectors may be connectable to the fitting.

The fitting may comprise a pipe or conduit defining at least one of: a male portion and a female portion. The fitting may connectable to a corresponding portion of the connector and further connector.

The assembly may form part of an overflow assembly for connecting an overflow of a fluid container to a plumbing drainage system.

The overflow assembly may be connectable to an overflow of a sink, bath, shower, bidet, or any other fluid containing vessel for connecting to a plumbing drainage system e.g. for a sewer, or the like.

The assembly may comprise an overflow defining a first fitting and a drain connector defining a second fitting. The assembly may further comprise at least two connectors according to any example of the present disclosure. The assembly may comprise a third fitting for connecting the at least two connectors together.

The first fitting may comprise at least one of: the body and the seat according to any example of the present disclosure. The second fitting may comprise at least one of: the body and the seat according to any example of the present disclosure. The third fitting may comprise at least one of: the body and the seat according to any example of the present disclosure.

The connectors may be connected to either end of the fitting, for example, one connector may be disposed on either end of the conduit. The connectors may allow the fitting to be readily connected to, or between, pre-positioned fittings. The pre-positioned fittings may be pre-installed fittings, for example, where an existing plumbing appliance has been installed such that the pre-installed fittings may be relatively difficult to re-position. It may not be possible to install a plumbing system, for example a grey or waste water disposal plumbing system, without providing the fittings of the plumbing system at particular positions. In such examples, the assembly may facilitate providing a connection between the fittings of the plumbing system.

As already described herein in relation to other examples, the connectors may be adaptable so as to allow angular and/or rotational manipulation of the fittings associated with the connectors. Thus, each of the connectors of the assembly may be connectable to any further fitting of the plumbing system, and the connectors may compensate for any angular and/or rotational misalignment between the fitting and the further fittings.

Further, the assembly may be adaptable so as to be able to connect pre-positioned fittings that are displaced relatively to each other. The pre-positioned fittings may have approximately the same or corresponding angular orientation, but may be axially and/or laterally displaced relative to each other. In such examples, the assembly may be adapted so that the connectors can each be angularly and/or rotationally manipulated to connect to the pre-positioned fittings, with the fitting of the assembly providing a connection therebetween. If the fitting of the assembly is substantially rigid or inflexible, the connectors of the assembly may provide the ability to connect angularly, rotationally, axially and/or laterally displaced pre-positioned fittings together.

According to an example of the present disclosure there is provided a method of connecting at least one connector according to any example of the present disclosure to a fitting. The fitting may be a pipe, fluid conduit, pipe assembly, or the like.

According to an example of the present disclosure there is provided a method of connecting a body to a seat to form a connector. The body, the seat and/or the connector may comprise any feature of any example of the present disclosure. The method may comprise contacting the body with the seat. The method may comprise securing the body on or within the seat. The method may comprise tightening a retaining element on the seat so as to secure the body on or within the seat. The method may comprise flexing or deforming a flexible portion between the seat and the body. The method may comprise tightening the retaining element relative to the seat so as to flex or deform the flexible portion. The body may define a male portion and the seat may define a female portion. The body may be inserted into the seat before or after the retaining element has been connected to the seat. The body may be inserted into the seat before or after the flexible portion has been provided between the seat and the body.

According to an example of the present disclosure there is provided an assembly for a plumbing system. The assembly may comprise at least two assemblies according to any example of the present disclosure. The assembly may comprise at least one fitting for connecting the at least two assemblies.

The fitting may comprise a pipe or conduit defining at least one of: a male portion and a female portion. The fitting may be connectable to a corresponding portion of the assemblies.

The assembly may comprise an overflow defining a first fitting. The assembly may comprise a drain connector defining a second fitting. The assembly may comprise at least two connectors according to any example of the present disclosure. The assembly may comprise a third fitting for connecting the at least two connectors together.

The assembly may further comprise a plug drain fitting. The plug drain fitting may define a fourth fitting. The plug drain fitting may define a fifth fitting for connecting the plug drain fitting to the drain connector. The assembly may comprise at least two connectors according to any example of the present disclosure.

The plug drain fitting may comprise or be a plug drain of a sink, bath, bidet, or the like.

The fourth fitting may comprise at least one of: the body and the seat according to any example of the present disclosure. The fifth fitting may comprise at least one of: the body and the seat according to any example of the present disclosure.

More than one assembly may be provided. There may be multiple pre-positioned fittings that may need to be connected together. Providing more than one assembly may facilitate the connection between such fittings, for example, where such pre-positioned fittings cannot be moved or are difficult to connect together.

The conduit may be a pipe, for example a waste pipe. The fitting may provide a connection between an outlet of a vessel, such as a bath, sink, toilet, bidet, urinal, or the like, and a component of a drainage system, such as a T-piece or the like.

It will be appreciated that various modifications may be made to the connector or assembly.

The assembly may be provided between a waste outlet of a plug hole, for example, in a bath or sink or the like, and a drainage system. The assembly may be provided between an overflow outlet, for example, in a bath or sink or the like, and the drainage system. More than one assembly may be provided so as to provide a connection between the waste outlet of a plug hole, an overflow outlet, and the drainage system. The drainage system may comprise a single outlet for connecting to a sewer or the like. The assembly may connect each of the waste outlets to the single outlet. The assembly may facilitate connection of at least one waste outlet to the single outlet by virtue of being angularly and/or rotationally adjustable.

The connector may be detachable from the first fitting and/or the second fitting. This may allow the assembly to be produced and sold as a set of parts, which may be subsequently assembled by the installer.

The connector or assembly may comprise predominantly metal. The metal may comprise any one of: brass, aluminum alloy, copper, stainless steel, or any other suitable metal material. The assembly may comprise more than one type of metal.

At least one feature of any example, aspect or embodiment of the present disclosure may modify, adapt or replace any corresponding feature of any example, aspect or embodiment of the present disclosure. At least one feature of any example, aspect or embodiment of the present disclosure may be combined with any other example, aspect or embodiment of the present disclosure.

BRIEF DESCRIPTION OF THE DRAWINGS

These and other examples of the present disclosure will now be described by way of example only and with reference to the accompanying drawings, in which.

DETAILED DESCRIPTION OF THE DRAWINGS

Figure 1:
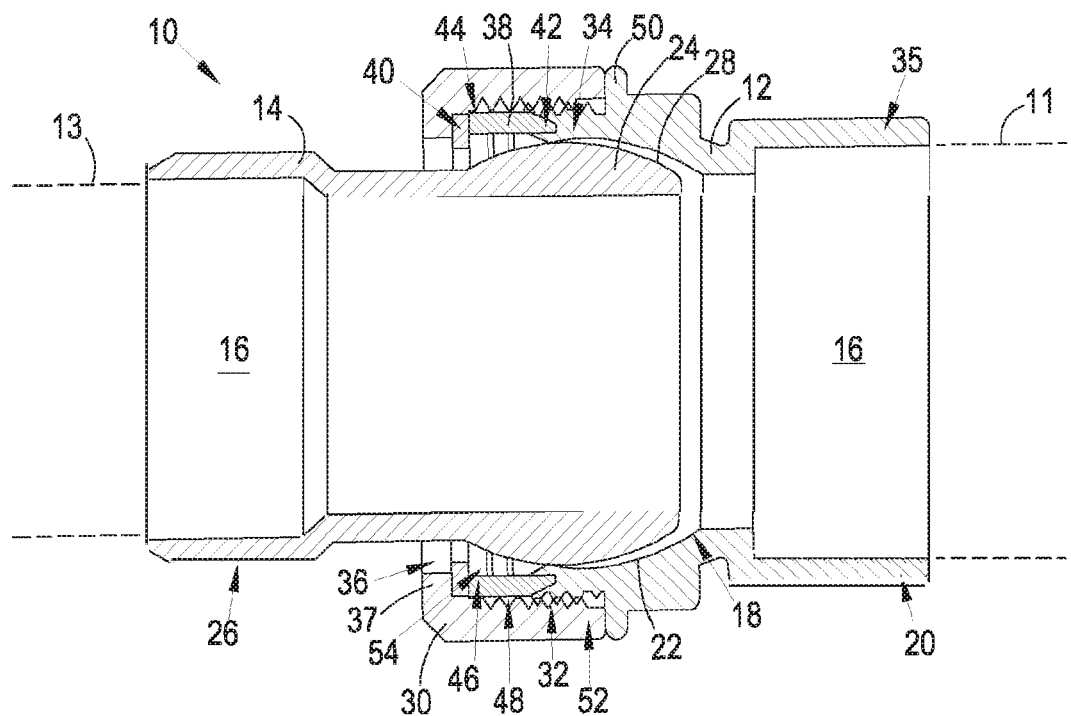
FIG. 1 is a cross-sectional view of a connector for a plumbing system in accordance with an example of the present disclosure.
Figure 2:
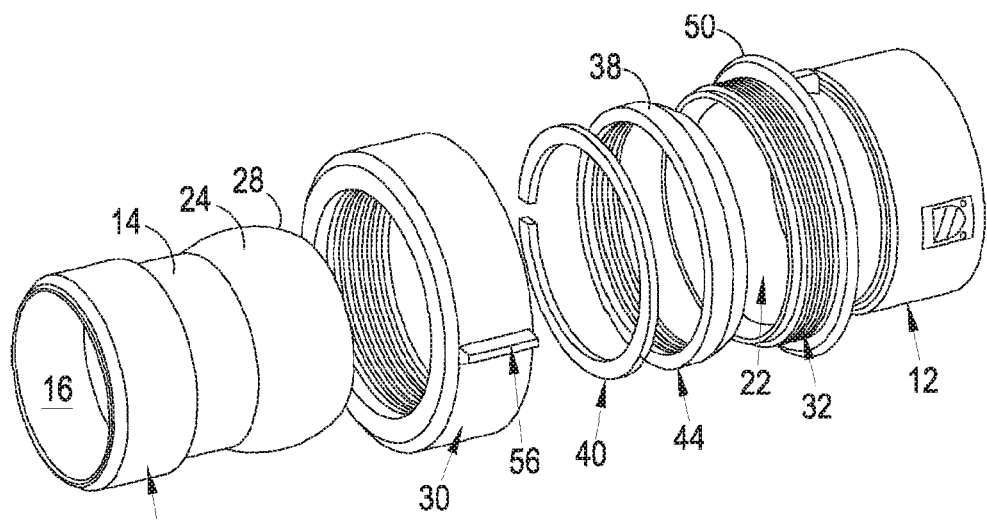
FIG. 2 is an exploded perspective view of the connector.

FIGS. 1 and 2 illustrate an example of a connector 10 for providing a connection between a first fitting 11 and second fitting 13 of a plumbing system (the dashed lines of the figures indicating an outer diameter of the first and second fittings 11, 13). The connector 10 includes a seat portion 12 and a body portion 14. The seat portion 12 and body portion 14 are two separate components which can be connected together to form the connector 10, at least part of the body portion 14 being capable of being inserted into and removed from the seat portion 12. The seat portion 12 and body portion 14 each include a through passage 16 for carrying fluid between the first fitting and the second fitting. With reference now to the illustrations collectively shown in FIGS. 2-11, the present invention discloses a rotary shifter with auto return to park functionality which will now be described. FIG. 2 depicts and assembly perspective view and FIG. 3 further provides an exploded view of the rotary shifter package, generally at 10, according to one non-limiting variant of the present invention.

On one side of the seat portion 12 there is a seat 18 for receiving at least part of the body portion 14, and on the other side of the seat portion 12 there is a female adaptor 20 for connecting to the first fitting 11. The conduit 16 of the seat portion 12 extends axially through the centre of the seat 18 and the female adaptor 20. In the present example the conduit 16 within the female adaptor 20 includes a larger inner diameter than the minimum inner diameter of the seat 18. However it will be appreciated that the female adaptor 20 could have the same or a smaller inner diameter than the inner diameter of the minimum inner diameter of the seat 18.

The seat 18 includes a first curved surface 22 that is generally arcuate or concave in shape. In the present example, the first curved surface 22 is approximately frusto-spherical or frusto-ovoidal shaped, but could be any appropriate shape.

At one axial end of the body portion 14 there is a body, which in the present example takes the form of a curved body 24, and at the other axial end of the body portion 14 there is a body portion adaptor 26 for connecting to the second fitting 13. The body portion adaptor 26 may be any appropriate size or shape. The body portion 14 is generally tubular. The conduit 16 of the body portion 14 extends axially through the centre of the curved body 24 and the body portion adaptor 26.

The curved body 24 includes a second curved surface 28 for corresponding with the first curved surface 22 of the seat 18, the second curved surface 28 being convex in shape (e.g. which may approximately or substantially correspond to the concave shape of the first curved surface 22). In the present example, the second curved surface 28 may be approximately frusto-spherical or frusto-ovoidal shaped. The curved body 24 may be considered to be an "olive", for example, being of frusto-ovoidal form with the conduit 16 extending axially therethrough. The maximum outer diameter of the curved body 24 is larger than the minimum inner diameter of the seat 18, but any appropriate configuration of inner and out diameters could be provided. Thus, the curved body 22 can be located in (or partially in) contact with the seat 18 without being pushed through the seat 18. Due to the correspondence between the shapes of the first curved surface 22 and the second curved surface 28, the seat portion 12 and the body portion 14 can be moved angularly and/or rotationally relative to each other.

The first and second curved surfaces 22, 28 are shaped to allow the body portion 14 and the seat portion 12 to be angularly and/or rotationally moved relative to each other.

Thus, where the first fitting 11 and second fitting 13 are angularly misaligned relative to each other, the connector 10 may compensate for any angular misalignment by virtue of being adaptable according to the angular orientation of the first and second fittings. The connector 10 may be configured to permit relative rotation of the seat portion 12 and the body portion 14 about a longitudinal axis of the seat portion 12 and/or body portion 14.

Where there is difficult-to-access space or angular and/or rotational misalignment between the first and second fittings, the connector 10 may be easier to install between the first and second fittings because an installer may be able to angularly manipulate the connector 10, and/or the first and second fittings so as to permit connection therebetween. Thus, even where there is misalignment between the first and second fittings 11, 13, the connector 10 may allow fluid communication therebetween via the conduit 16. Further, the mechanical strength of the connector 10 may be adjustable and/or the connector 10 may be clamped in position.

The connector 10 also includes a retaining element in the form of a nut portion 30 for releasably retaining the body portion 14 in the seat portion 12. The nut portion 30 is operatively associated with the seat portion 12 by virtue of corresponding screw threads 32 provided on a radially outer portion of the seat portion 12 and a radially inner portion of the nut portion 30. The corresponding screw threads 32 of the seat portion 12 are provided near an opposite axial end 34 of the seat portion 12 to an axial end 35 of the female adaptor 20, the axial end 35 being configured to receive the first fitting 11. Thus, the nut portion 30 can be screwed onto the seat portion 12. The curved body 24 can be inserted through the opening 36 of nut portion 22 so as to become seated in the seat 18, the opening 36 being defined by a circumferential lip 37 within the entrance of the nut portion 36. The inner diameter of the lip 37 is larger than the maximum outer diameter of the curved body 24 so as to permit the curved body 24 to be inserted through or removed from the opening 36 as required.

However, in order to releasably retain the curved body 24 in or near the seat 18, there is provided a flexible portion 38 and a spacer in the form of a washer 40, which in this example is an open washer including an opening extending radially through the washer 40 perimeter. The flexible portion 38 is generally annular and is disposed at or near the opposite axial end 34 of the seat portion 12. The flexible portion 38 varies in radial thickness along its longitudinal axis such that the flexible portion 38 is thinner where, in use, an axial edge 42 of the flexible portion 38 abuts a portion at or near the opposite axial end 34 of the seat portion 12, and is thicker at an opposite axial edge 44 of the flexible portion 38. In the present example, the flexible portion 38 includes a substantially planar radially inner surface 46, which may include a tapered and/or frusto-ovoidal surface. The flexible portion 38 also includes a substantially curved radially outer surface 48, which may include a tapered and/or a frusto-ovoidal surface. However, due to the flexibility of the flexible portion 38 the particular shape of the flexible portion 38 can be adapted or flexed as required. The particular non-flexed or non-deformed shape of the flexible portion 38 can depend on the particular shape and/or configuration of the seat portion 12, body portion 14 and nut portion 30, and thus the flexible portion 38 may be adapted as necessary. In various examples, the flexible portion 38 may be substantially elastic, plastic, deformable, rigid, resilient, or the like. In the present example the flexible portion 38 is formed from nitrile rubber, but may be formed from or comprise any other appropriate material, for example, plastics, rubbers, or the like.

The washer 40 is disposed between the opposite axial edge 44 of the flexible portion 38 and the lip 37. The washer 40 is dimensioned to prevent the flexible portion 38 from flexing, deforming or passing through the lip 37 and/or the curved body 24 from being removed from the seat 18 when the nut portion 30 has been tightened against the seat portion 12. The radially outer diameter of the washer 40 is larger than the inner diameter of the lip 37, but smaller than the inner diameter of the nut portion 30. Thus, when the nut portion 30 is at least partially screwed onto the seat portion 12, the flexible portion 38 and the washer 40 are or can be disposed between the lip 37 and the opposite axial end 34 of the seat portion 12.

In use, the nut portion 30 can be screwed onto or from the corresponding threads 32 of the seat portion 12. The seat portion 12 includes a flange 50 for stopping further screwing of the nut portion 30 when an axial edge 52 of the nut portion 30 opposite to that of the opening 36 abuts the flange 50.

If the curved body 24 has been inserted into the region near or on the seat 18, a space 54 is defined between the curved body 24, the seat portion 12 and the nut portion 30, the space 54 accommodating the flexible portion 38 and the washer 40. The space 54 is variable in size depending on whether the flexible portion 38 has been flexed or deformed. The washer 40 may also be flexed or deformed in terms of diameter. To retain the curved body 24 within the region near or in the seat 18, the flexible portion 38 and/or washer 40 is flexed or deformed so as to be varied in size so as to define a restriction for preventing removal of the curved body 24 from the region near or in the seat 18. In the present example, the space 54 accommodates the varying shape of the flexible portion 38 and/or the washer 40, which change shape or diameter so that the curved body 24, by virtue of its maximum outer diameter, cannot pass through the flexible portion 38 and/or washer 40 (e.g. if the flexible portion 38 and/or the washer 40 have sufficiently changed shape or deformed). The flexible portion 38 is deformable such that an axial compression of the flexible portion 38 causes a radial expansion of the flexible portion 38. The flexible portion 38 may have any appropriate property such as elasticity to permit the flexible portion 38 to return to its original non-deformed shape when no longer compressed or deformed. In the present example, the nut portion 30 causes the washer 40 to press against the flexible portion 38 to cause axial compression thereof. The flexible portion 38 then deforms and expands radially (i.e. radially inwardly in this example) to contact an outer surface of the curved body 24. The inner diameter of the deformed flexible portion 38 is then smaller than the outer diameter of the curved body 24, thereby preventing the curved body 24 from moving past the flexible portion 38 due to the restricted or reduced diameter thereof.

Thus, the flexible portion 38 may resist, and where appropriate stop, the curved body 24 from being moved therethrough. The curved body 24 may be seated within the seat 18 and may be configured such that angular and/or rotational adaptation of the seat portion 12 relative to the body portion 14 is permitted. The nut portion 30 can be adjusted to compress the flexible portion 38 such that the curved body 24 is retained in the vicinity of the seat 18, while still permitting angular and/or rotational adaptation of the seat portion 12 relative to the body portion 14. Once the nut portion 30 has been tightened it may be possible to secure or lock the nut portion 30 to the seat portion 12 by any appropriate method. For example, it may be possible to provide adhesive inside the connector 10 and/or retain the shape of the flexible portion 38 to prevent movement of the fittings 11, 13 relative to each other, for example, if an object connected to said fittings moves (e.g. if said object is a bath (not shown) or the like, and a user is in the bath).

In some cases, the nut portion 30 can be adjusted relative to the seat portion 12 so that the space 54 is appropriately varied so that the curved body 24 can be inserted or removed from the seat 18. In some of these cases, the space 54 can be varied so as to permit the flexible portion 38 and/or washer 40 to be flexed or deformed so as to permit the passage of the curved body 38 therethrough. An installer of the connector 10 may therefore find that it is possible to push-fit the curved body 24 into the connector 10 and/or overcome resistance of the flexible portion 38 by appropriately adjusting the nut portion 30 so as to enable passage of the curved body 24 into the seat 18. This push-fit functionality may assist the installer in terms of installation in difficult-to-access spaces by avoiding the need to connect the nut portion 30 to the seat portion 12 in situ, which may be relatively awkward. Thus the installer may attach the seat portion 12 to the first fitting with the nut portion 30 pre-installed on the seat portion 12. The installer may subsequently attach the body portion 14 and the second fitting by push-fitting the curved body 24 into the connector 10 via the opening 36. At an appropriate time, the installer may tighten the nut portion 30 on the seat portion 12 so as to retain the curved body 24 in or in the vicinity of the seat 18. Formations/lugs 56 are provided on the outer surface of the nut portion 30 to facilitate tightening of the nut portion 30 by permitting the application of torque to the nut portion 30. Once in the vicinity of the seat 18, the correspondence between the first and second curved surfaces 22, 28 may permit the seat portion 12 and the body portion 14 to be angularly and/or rotationally manipulated so as to facilitate the connection between the first and second fittings, in accordance with the relative angular and/or rotational positioning of the first and second fittings. If required, the nut portion 30 can be adjusted so that the curved body 24 is releasable from the connector 10.

The connector 10 may comprise or be formed of any appropriate material. In the present example, the seat portion 12, body portion 14 and nut portion 30 are formed of Polyvinyl Chloride (PVC), and the washer 40 is formed of High Density Polyethylene (HDPE). It will however be appreciated that any appropriate plastics material may be used, for example, Acrylonitrile-Butadiene-Styrene (ABS), Polypropylene (PP), or the like. At least one of the components may comprise or be formed of a rubber material, for example any appropriate synthetic or natural rubbers. At least one of the components of the connector 10 may comprise or be formed of a metal material, for example, steel, stainless steel, aluminum, brass, copper and the like. Thus, the connector 10 may provide an angularly and/or rotationally adaptable connection while potentially complying with regulatory requirements or the like, which in some cases may require metals instead of plastics be used in plumbing systems so as to reduce fire risk, or other risks. At least one of the components may comprise or be formed of a metal material and at least one other of the components may comprise or be formed of a plastics material. There may be requirement to maintain a preferred aesthetic appearance, for example by forming user-visible components in metal and non-visible components in a plastics material, thereby potentially reducing costs and/or weight. Thus, the connector 10 may provide a relatively easy way of providing a connection between fittings made of different materials, for example in plastics-to-plastics connections, in metal-to-plastics connections, in metal-metal connections, and/or in connections utilising any other appropriate material.

Figure 3:
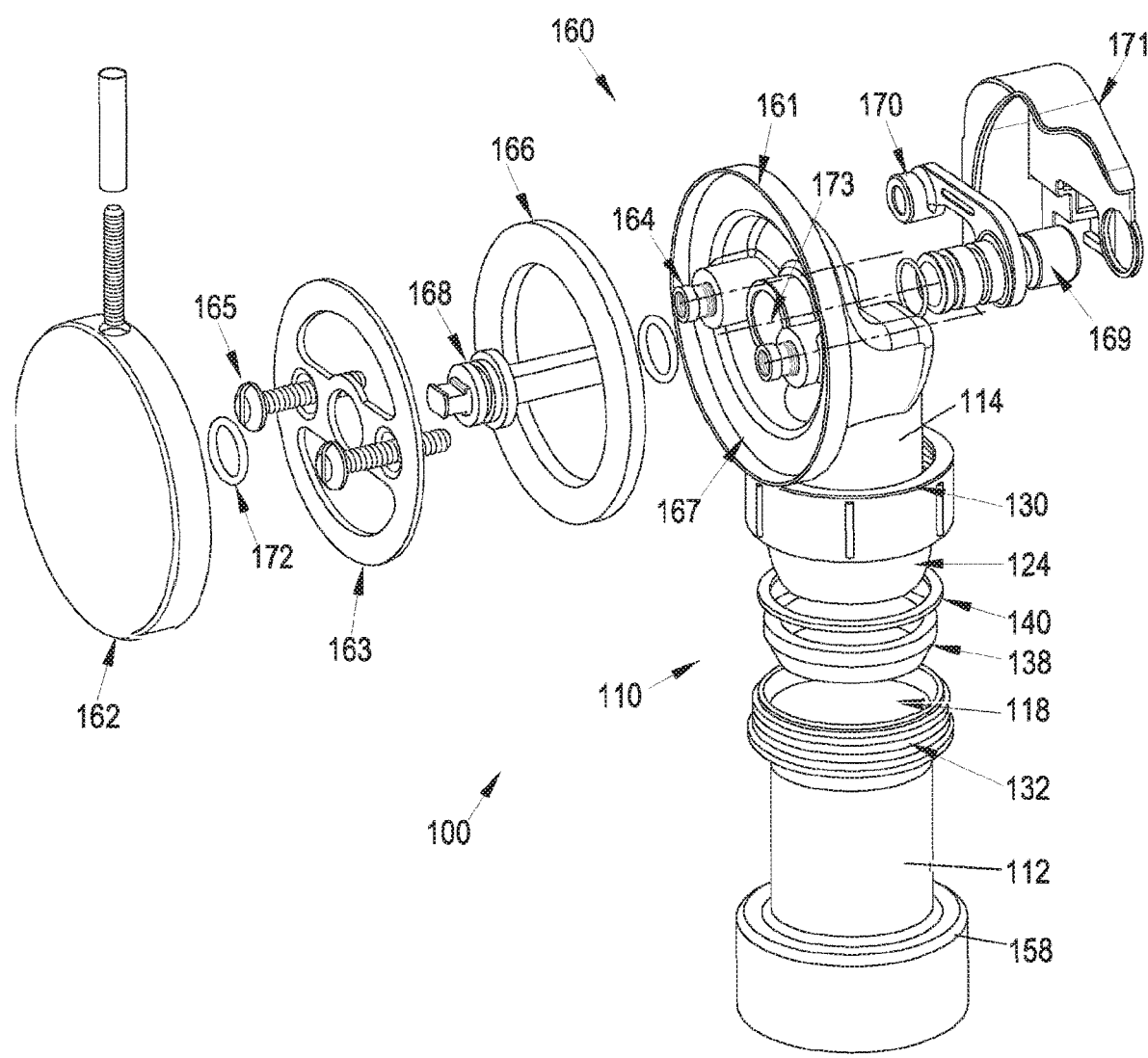
FIG. 3 is an exploded perspective view of the connector provided as part of an overflow assembly.
Figure 4:
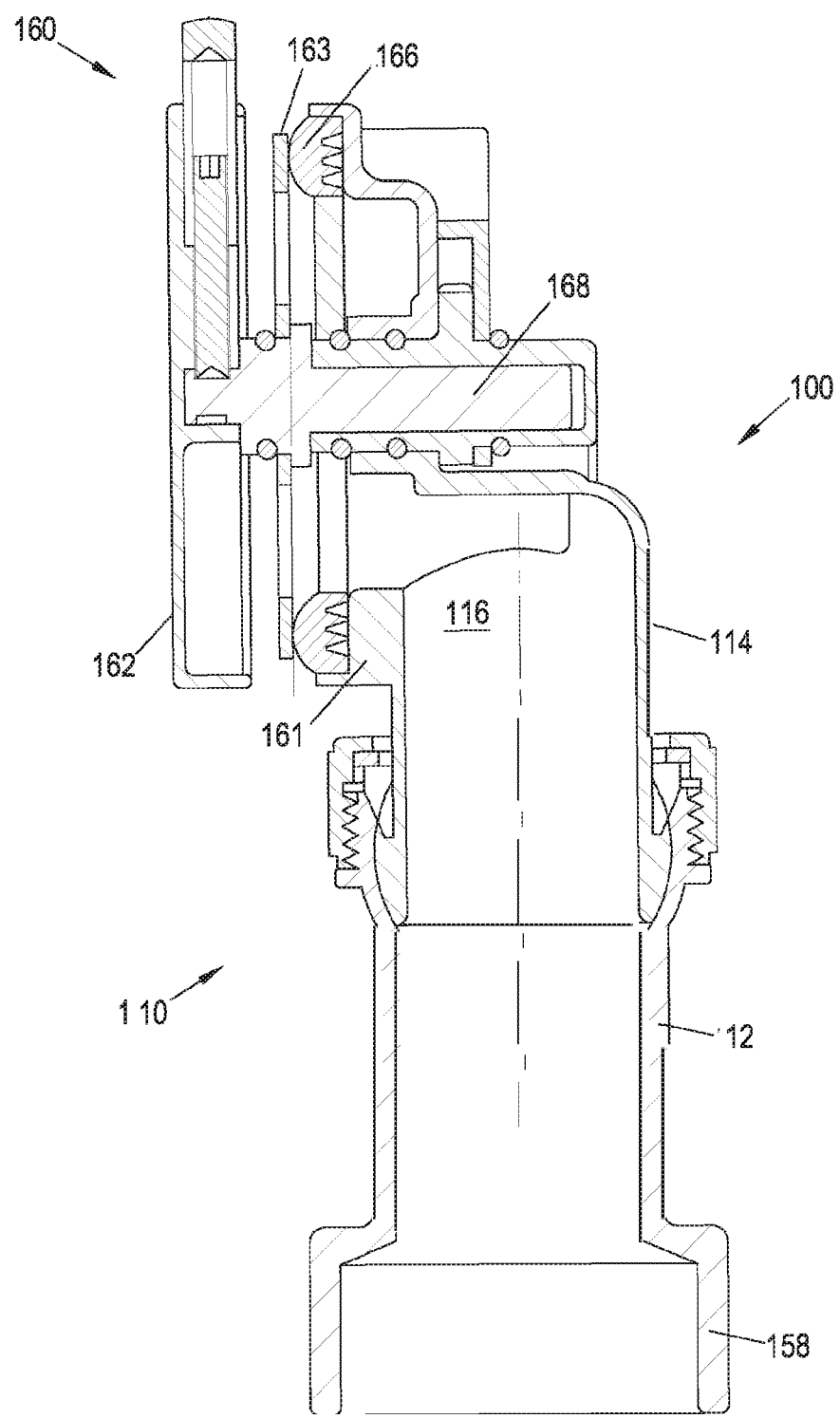
FIG. 4 is a cross-sectional view of the connector provided as part of the overflow assembly.

Referring next to FIGS. 3 and 4, there is illustrated an overflow assembly 100 for use with, for example, a bath or sink (not shown), and which includes a connector 110. Connector 110 includes substantially the same components and functionality as the connector 10 of FIGS. 1-2, and features of the connector 110 have been incremented by 100 for features which correspond with the features of the connector 10. Overflow assembly 100 includes a first fitting 158 for connecting to a down pipe (not shown). Overflow assembly 100 also includes a second fitting in the form of an overflow head assembly 160. The connector 110 may facilitate simpler connection of the overflow head assembly 160 to a connection pipe (not shown) to a drainage system (not shown), for example where there is angular and/or rotational misalignment between the overflow head assembly 160 and the drainage system.

Overflow head assembly 160 includes an overflow outlet body 161 that is integrally formed as part of the body portion 114, whereby the overflow outlet body 161 is fluidly connected to the conduit 116 of the body portion 114. During installation, the overflow outlet body 161 and the seat portion 112 can be angularly and/or rotationally manipulated as required. Also illustrated are further components of the overflow head assembly 160. The overflow head assembly 160 includes an overflow cover and control assembly 162 for controlling the opening and closing of a plug (not shown). An overflow outlet plate 163 is mounted on inserts 164 disposed in the overflow outlet body 161 using corresponding screws 165, and is positioned adjacent a seal ring 166, which seals around an opening 167 of the overflow outlet body 161. The overflow outlet plate 163 permits fluid to flow into the overflow outlet body 161 and provides an opening for allowing a pivot member 168 to attach overflow cover and control assembly 162 to a plug actuator 169 disposed on the other side of the overflow outlet body 161 to that of the overflow cover and control assembly 162. A user may rotate the overflow cover and control assembly 162 so as to move the plug actuator 169, thereby moving a lever 170 to enable pulling or pushing on a cable (not shown) for opening or closing the plug (not shown). The plug actuator 169 is protected by a plug actuator cover 171. O-ring seals 172 provide seals for preventing fluid from escaping out of the overflow outlet body 161 via a passage 173, within which is disposed the pivot member 168 so as to link together the overflow cover and control assembly 162 and the plug actuator 169.

Figure 5:
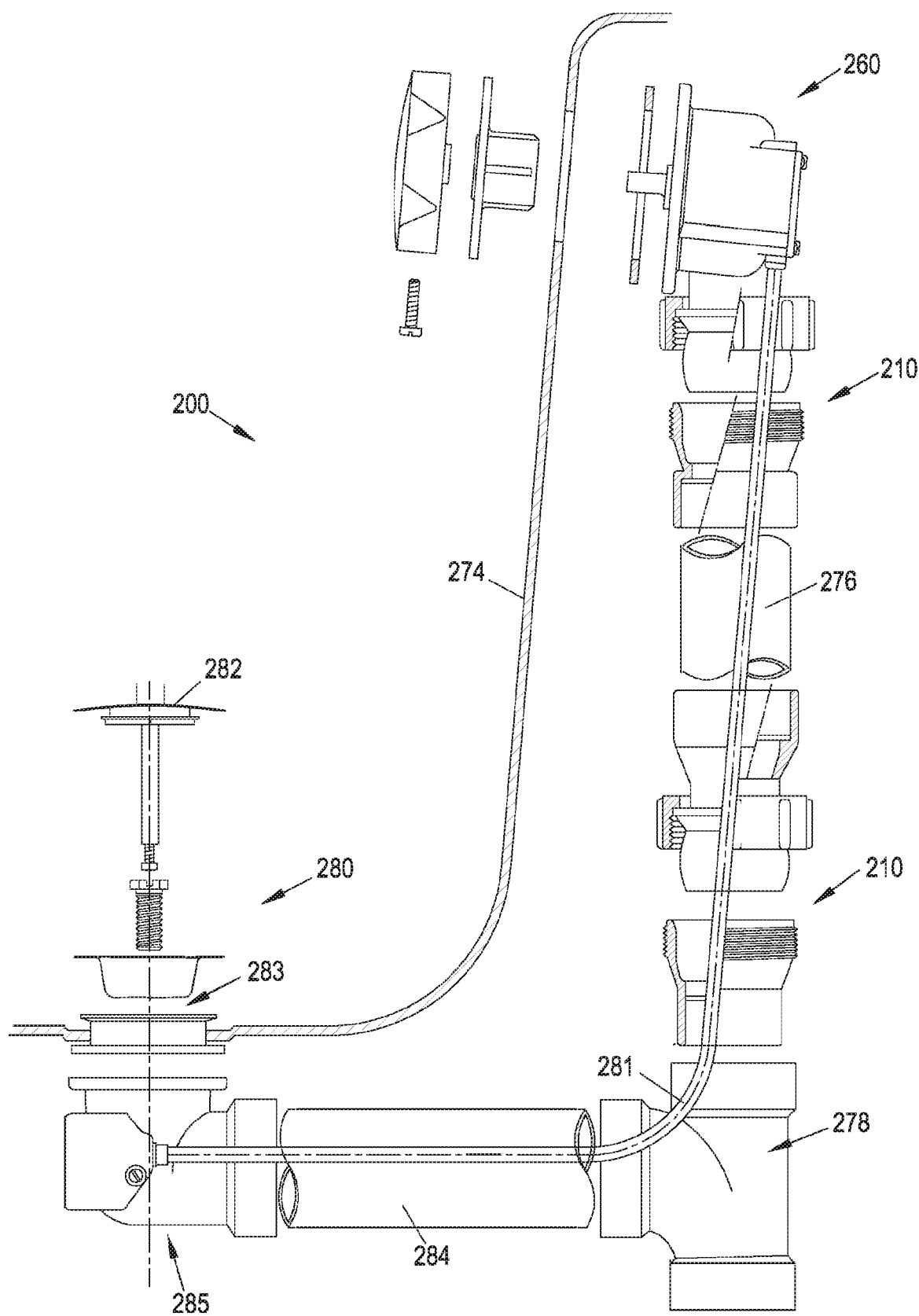
FIG. 5 is an exploded side view of a bath waste assembly in accordance with an example of the present disclosure.

Referring next to FIG. 5, there is illustrated an example of a bath and overflow assembly 200. Bath and overflow assembly 200 includes an overflow head assembly 260, which may include the same or similar features to that of overflow head assembly 160. The overflow head assembly 260 is positioned within an upper part of a bath surface 274. Bath and overflow assembly 200 also includes two connectors 210 disposed at each end of a down pipe 276; the connectors 210 may have the same or similar features to those of connectors 10, 100. The down pipe 276 is connected to a drainage system connector in the form of a T-piece 278 or other appropriate arrangement positioned behind and below the bath surface 274, the T-piece 278 leading to a drain, soil stack or sewer (not shown). It will be noted that the connectors 210 are oriented in opposite directions to each other. However, any appropriate arrangement of the connectors 210 may be utilised. Thus, in the example of FIG. 5, the "first fitting" for both the connectors 210 is the down pipe 276. The "second fitting" for the upper connector 210 is the overflow outlet body 261. The "second fitting" for the lower connector 210 is the T-piece 278. During installation, an installer may be able to readily manipulate the angular and/or rotational positioning of the down pipe 276 according to the positioning of the overflow head assembly 260 and the T-piece 278 by virtue of the provision of the two connectors 210.

Also illustrated in FIG. 5 is a plug assembly 280 which can be actuated using cable actuator 281 running from the overflow head assembly 260 so that a plug 282 seals or unseals the bath plughole 283. The plughole 283 being disposed in a lower portion of the bath surface 274 includes a plug drainage pipe 284 running substantially horizontally, preferably angled downwards, from plug drainage body 285 towards the T-piece 278. The plug drainage pipe 284 is rigidly connected to the plug drainage body 285 and the T-piece 278.

Figure 6:
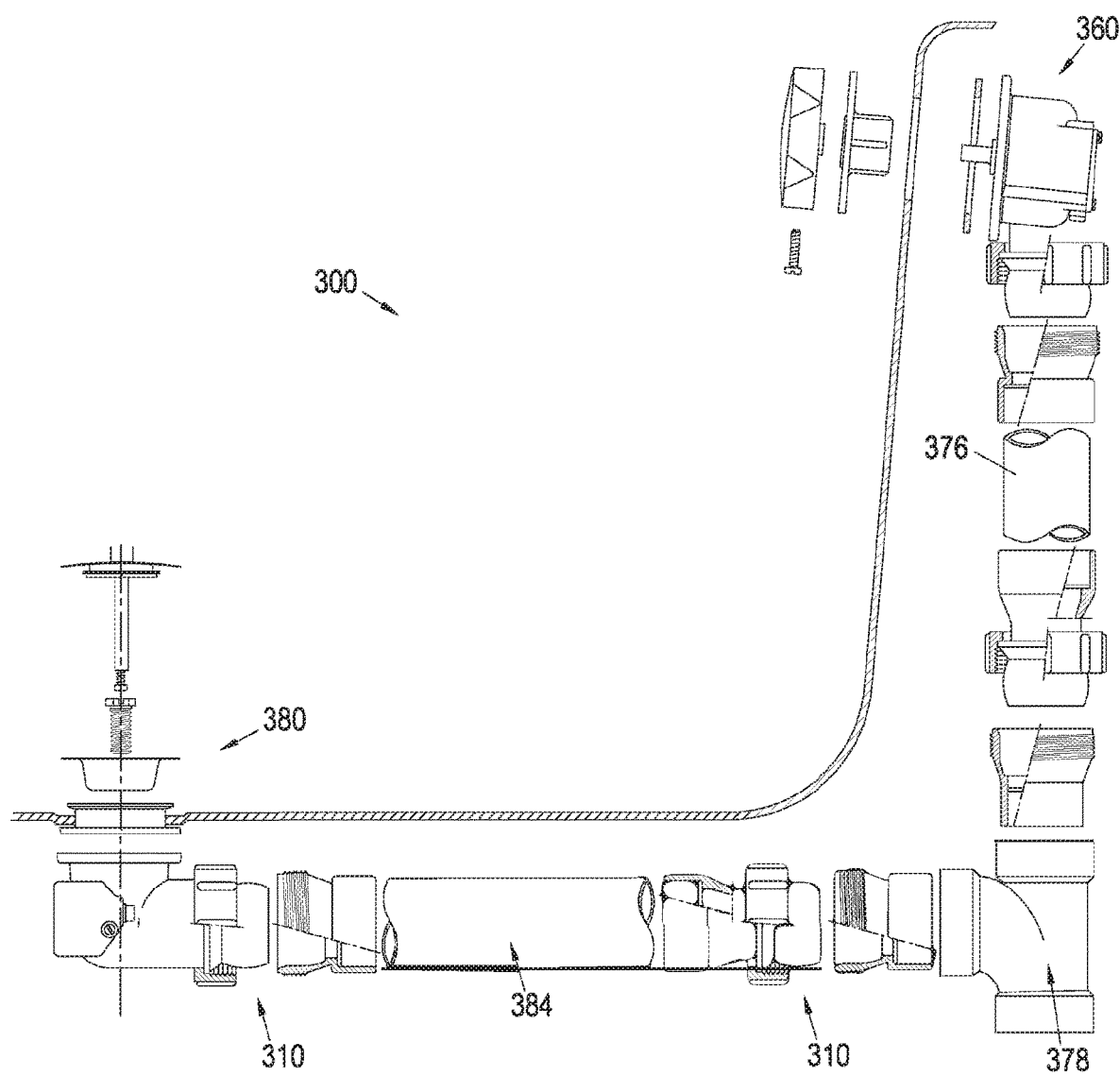
FIG. 6 is an exploded side view of another example of a bath waste assembly.

Referring next to FIG. 6, there is illustrated an example of a bath and overflow assembly 300. The bath and overflow assembly 300 of FIG. 6 is similar to the bath and overflow assembly 200 of FIG. 5. However, plug drainage pipe 384 further includes two additional connectors 310 disposed at each end thereof. Thus, an installer may be able to readily manipulate the angular and/or rotational positioning of the plug drainage pipe 384 according to the positioning of the plug assembly 380 and the T-piece 378, and at the same time, manipulate the angular and/or rotational positioning of the down pipe 376 according to the positioning of the overflow head assembly 360 and the T-piece 378.

The components of the connectors or assemblies of the examples described herein could comprise or be formed of any appropriate material or materials. For example, potentially user-visible parts such as the overflow cover and control assembly 162 the overflow outlet body 161 and/or the inserts 164 could be made of metal, whereas the non-visible parts such as the connector 110 and associating plumbing could be made of plastics materials so as to potentially save costs and/or weight. In the illustrated examples, visible parts may be made of brass or stainless steel, although other materials may be appropriate. The connector 110 and other user non-visible components may be made of any appropriate material depending on user requirements.

It will be appreciated that while the present examples generally refer to baths and the like, the features of the connectors or assemblies may equally be applied in other settings, for example, in other plumbing arrangements such as sinks, bidets, showers, toilets, or the like, and/or in ventilation systems. The connectors may have utility in any type of plumbing connection requiring adaptability to the orientation of the fittings.

Components such as the flexible portion 38 and/or washer 40 may not be provided as separate components; instead one or both may be integrally formed with one of the other components of the connectors. There may be no requirement for the flexible portion 38 and/or washer 40 as the other components may compensate for at least some of the functionality of these components. Any appropriate number of connectors 10 may be provided depending on user requirements. Fittings may be provided integrally formed with a component of the connector 10 so as to reduce the number of parts that need to be assembled in situ. An installer may use an adaptor to attach the connector to a particular fitting.

Having described my invention, other and additional embodiments will become apparent to those skilled in the art to which it pertains, and without deviating from the scope of the appended claims:

We claim:

1. A connector for a plumbing system, comprising:
a seat comprising a first curved surface and being connectable to a first fitting;
a body comprising a second curved surface for corresponding with the first curved surface of the seat and being connectable to a second fitting,
wherein the body is moveable relative to the seat so as to adapt to a relative angular orientation of the first and second fittings,
and wherein the seat and the body are configured to provide fluid communication between the first fitting and the second fitting;
a retaining element for releasably retaining the body in the seat; and
a flexible portion disposable between the body and the retaining element,
wherein the retaining element is configured to be adjustable relative to the seat,
wherein the flexible portion is elastically deformable by the adjustment of the retaining element relative to the seat so as to reconfigure the flexible portion by varying an inner diameter of the flexible portion between;
a first configuration in which said inner diameter of the flexible portion is larger than a maximum inner diameter of the first curved surface of the seat and in which the body is movable through the flexible portion for allowing the body to be inserted and removed from the seat; and
a second configuration in which said inner diameter of the flexible portion is smaller than a maximum outer diameter of the second curved surface of the body and in which the body is retained in the seat by the flexible portion.

2. The connector of claim 1, wherein at least one of:
the flexible portion is substantially annular;
the flexible portion comprises an axially varying radial thickness;
an inner surface of the flexible portion is shaped to substantially correspond to an outer surface of the body;
an inner surface of the flexible portion is curved or at least partially curved.

3. The connector of claim 1, comprising a spacer configured to be disposed between the flexible portion and the retaining element.

4. The connector of claim 1, wherein the retaining element comprises a circumferential lip having an inner diameter, wherein the flexible portion is disposed between the circumferential lip and the seat, and wherein in the first configuration the inner diameter of the flexible portion is larger than the inner diameter of the circumferential lip.

5. The connector of claim 1, wherein the seat comprises a first material and the body comprises a second material, and wherein the first material and the second material are different.

6. The connector of claim 5, wherein one of the first and second materials comprises a metal, and the other of the first and second materials a plastics material.

7. The connector of claim 1, wherein the flexible portion is configurable to apply a force on the body upon the flexible portion being flexed by adjustment of the retaining element relative to the seat.

8. The connector of claim 7, wherein the retaining element is configured to adjust the mechanical strength of the connection between the body and the seat by controlling the force applied by the flexible portion on the body by adjusting the retaining element relative to the seat.

9. The connector of claim 7, wherein the retaining element is configurable to clamp a connection between the body and the seat by adjusting the retaining element such that the force is sufficient to immobilize the body relative to the seat.

10. An assembly for a plumbing system, comprising:
at least one connector;
wherein the at least one connector comprises:
a seat comprising a first curved surface and being connectable to a first fitting;
a body comprising a second curved surface for corresponding with the first curved surface of the seat and being connectable to a second fitting,
wherein the body is moveable relative to the seat so as to adapt to a relative angular orientation of the first and second fittings, and wherein the seat and the body are configured to provide fluid communication between the first fitting and the second fitting;
a retaining element for releasably retaining the body in the seat,
a flexible portion disposable between the body and the retaining element, wherein the retaining element is configured to be adjustable relative to the seat,
wherein the flexible portion is elastically deformable by the adjustment of the retaining element relative to the seat so as to reconfigure the flexible portion by varying an inner diameter of the flexible portion between;
a first configuration in which said inner diameter of the flexible portion is larger than a maximum diameter of the first curved surface of the seat and in which the body is movable through the flexible portion for allowing the body to be inserted and removed from the seat; and
a second configuration in which said inner diameter of the flexible portion is smaller than a maximum outer diameter of the second curved surface of the body and in which the body is retained in the seat by the flexible portion and wherein the assembly comprises at least one of the first and second fittings.

11. The assembly of claim 10, wherein the at least one of the first and second fittings is a conduit or pipe.

12. The assembly of claim 11, wherein the pipe or conduit defines at least one of a male portion and a female portion connectable to a corresponding portion of the at least one connector.

13. The assembly claim 10, wherein the assembly forms a part of an overflow assembly for connecting an overflow of a fluid container to a plumbing drainage system.

14. The assembly of claim 13, wherein the first fitting is in the form of an overflow and the second fitting is in the form of a drain connector.

15. The assembly of claim 14, wherein the at least one connector comprises two connectors, and the assembly comprises a third fitting for connecting the two connectors together.

16. The assembly of claim 15, wherein the assembly comprises a fourth fitting in the form of a plug drain fitting and a fifth fitting for connecting the plug drain fitting to the drain connector.

17. A method of connecting plumbing fittings using a connector,
wherein the connector comprises:
a seat comprising a first curved surface and being connectable to a first fitting;
a body comprising a second curved surface corresponding with the first curved surface of the seat and being connectable to a second fitting,
wherein the body is moveable relative to the seat so as to adapt to a relative angular orientation of the first and second fittings,
and wherein the seat and the body are configured to provide fluid communication between the first fitting and the second fitting;
a retaining element for releasably retaining the body in the seat;
a flexible portion disposable between the body and the retaining element,
wherein the retaining element is configured to be adjustable relative to the seat, and
wherein the flexible portion is elastically deformable by the adjustment of the retaining element relative to the seat so as to reconfigure the flexible portion by varying an inner diameter of the flexible portion between;
a first configuration in which said inner diameter of the flexible portion is larger than a maximum inner diameter of the first curved surface of the seat and in which the body is moveable through the flexible portion for allowing the body to be inserted and removed from the seat; and
a second configuration in which said inner diameter of the flexible portion is smaller than a maximum outer diameter of the second curved surface of the body and in which the body is retained in the seat by the flexible portion;
and wherein the method comprises:
connecting the seat to the first fitting;
connecting the body to the second fitting;
inserting the body into the seat; and
adjusting the retaining element relative to the seat so as to reconfigure the flexible portion from the first configuration to the second configuration and retain the body in the seat.

* * * * *